(12) United States Patent  
Tsuchitoi

(10) Patent No.: US 8,130,402 B2
(45) Date of Patent: Mar. 6, 2012

(54) IMAGE FORMING SYSTEM, STORAGE MEDIUM, AND IMAGE FORMING METHOD

(75) Inventor: Yuki Tsuchitoi, Kanagawa (JP)

(73) Assignee: Fuji Xerox Co. Ltd., Tokyo (JP)

( * ) Notice: Subject to any disclaimer, the term of this patent is extended or adjusted under 35 U.S.C. 154(b) by 860 days.

(21) Appl. No.: 12/177,452

(22) Filed: Jul. 22, 2008

(65) Prior Publication Data

US 2009/0097048 A1 Apr. 16, 2009

(30) Foreign Application Priority Data

Oct. 12, 2007 (JP) .................................. 2007-266065

(51) Int. Cl.
*H04N 1/04* (2006.01)
(52) U.S. Cl. ........ 358/1.15; 358/1.16; 358/540; 358/468
(58) Field of Classification Search .................. 358/358, 358/1.15, 1, 16, 540, 468, 501
See application file for complete search history.

(56) References Cited

U.S. PATENT DOCUMENTS

| | | | | |
|---|---|---|---|---|
| 5,440,408 | A | * | 8/1995 | Tomita ........................... 358/468 |
| 6,727,999 | B1 | * | 4/2004 | Takahashi .................... 358/1.15 |
| 7,006,247 | B1 | | 2/2006 | Sekine et al. |
| 2006/0126096 | A1 | | 6/2006 | Yasukaga et al. |

FOREIGN PATENT DOCUMENTS

| | | |
|---|---|---|
| JP | 2004194354 | 7/2004 |
| JP | 2006067168 | 3/2006 |
| JP | 2006166156 | 6/2006 |
| JP | 2006256065 | 9/2006 |
| JP | 2006324954 | 11/2006 |

OTHER PUBLICATIONS

The Notice of Grounds of Rejection issued on Jan. 5, 2010, corresponding to Japanese Patent Application No. 2007-266065 together with an English translation.

* cited by examiner

*Primary Examiner* — Houshang Safaipour
(74) *Attorney, Agent, or Firm* — Gesmer Updegrove LLP

(57) ABSTRACT

A first acquiring unit acquires a print target image. A storage unit has stored thereon a combination image to be combined with the print target image in association with a judgment condition for determining whether the combination image is combined with the print target image. A second acquiring unit acquires attribute values related to the print target image or a print environment when starting execution of printing of the print target image. A judging unit makes a judgment based on the attribute values acquired by the second acquiring unit and the judgment condition stored in the storage unit about whether the attribute values satisfy the judgment condition. A combination controller performs control to combine the combination image with the print target image when the judging unit judges that the attribute values satisfy the judgment condition.

8 Claims, 8 Drawing Sheets

EXEMPLARY DATA CONFIGURATION OF IMAGE
COMBINATION INFORMATION

| | | "USER NAME PRINT" | | |
|---|---|---|---|---|
| COMBINATION DEFINITION INFORMATION | RULE 1 | "text_layout" | | |
| | | JUDGMENT CONDITION | CONDITION 1 | |
| | | | CONDITION 2 | |
| | | ACTION | | |
| | RULE 2 | "default" | | |
| | | JUDGMENT CONDITION | CONDITION 1 | |
| | | ACTION | | |
| FORM IMAGE | | "text_form" | | |
| | | "default_form" | | |

FIG. 9

IMAGE FORMING SYSTEM, STORAGE MEDIUM, AND IMAGE FORMING METHOD

CROSS-REFERENCE TO RELATED APPLICATIONS

This application is based on and claims priority under 35 USC 119 from Japanese Patent Application, No. 2007-266065 filed on Oct. 12, 2007.

BACKGROUND

1. Technical Field

The present invention relates to an image forming system, an image forming system, a storage medium, and an image forming method.

2. Related Art

Conventional image forming apparatuses such as printers include a model with a function of combining an additional image with a print target image to be printed before output. For example, forms created as composite images are preliminarily registered in a printer, and a form number desired to be combined is specified in a print instruction given to the printer from a user. The printer combines a form image identified by the form number with a main body image to be printed in accordance with the sent print instruction to create and print the print image.

SUMMARY

An image forming system according to the present invention includes a first acquiring unit that acquires a print target image; a memory that has stored thereon a combination image to be combined with the print target image in association with a judgment condition for determining whether the combination image is combined with the print target image; a second acquiring unit that acquires attribute values related to the print target image or a print environment when starting execution of printing of the print target image; a judging unit that makes a judgment based on the attribute values acquired by the second acquiring unit and the judgment condition stored in the memory about whether the attribute values satisfy the judgment condition; and a combination controller that performs control to combine the combination image with the print target image when the judging unit judges that the attribute values satisfy the judgment condition.

BRIEF DESCRIPTION OF THE DRAWINGS

An exemplary embodiment of the present invention will be described in detail based on the following figures, wherein:

FIG. 9 shows an example of image combination information generated from the setup screens shown in FIGS. 7 and 8;

DETAILED DESCRIPTION

A preferred embodiment of the present invention will hereinafter be described with reference to the drawings.

Figure 1:
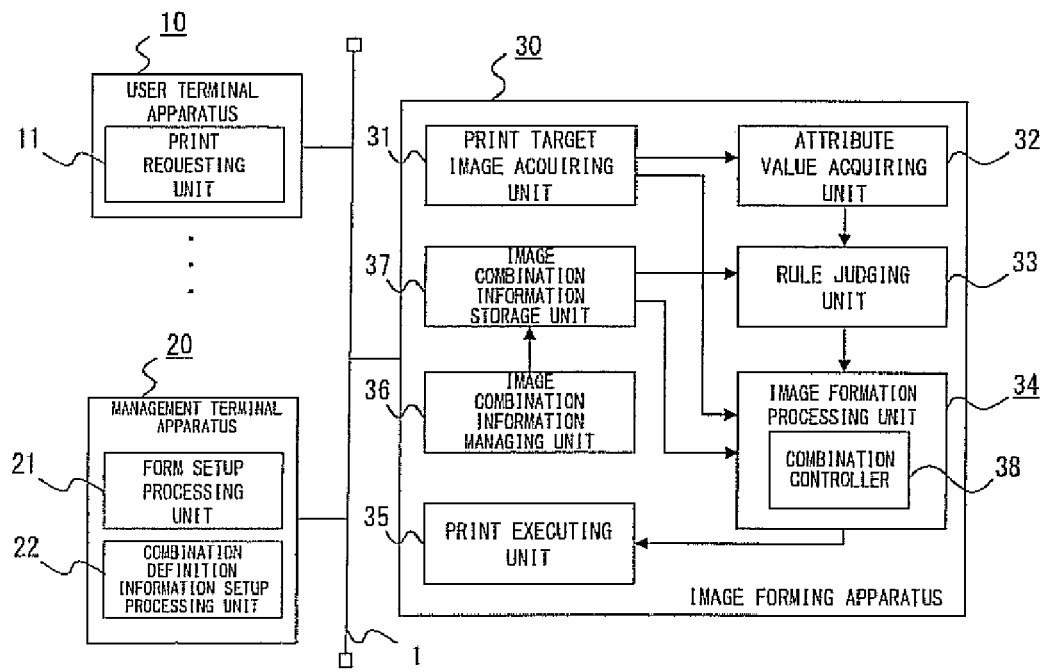
FIG. 1 shows an overall configuration of a network system using one embodiment of an image formation processing system according to the present invention.
Figure 2:
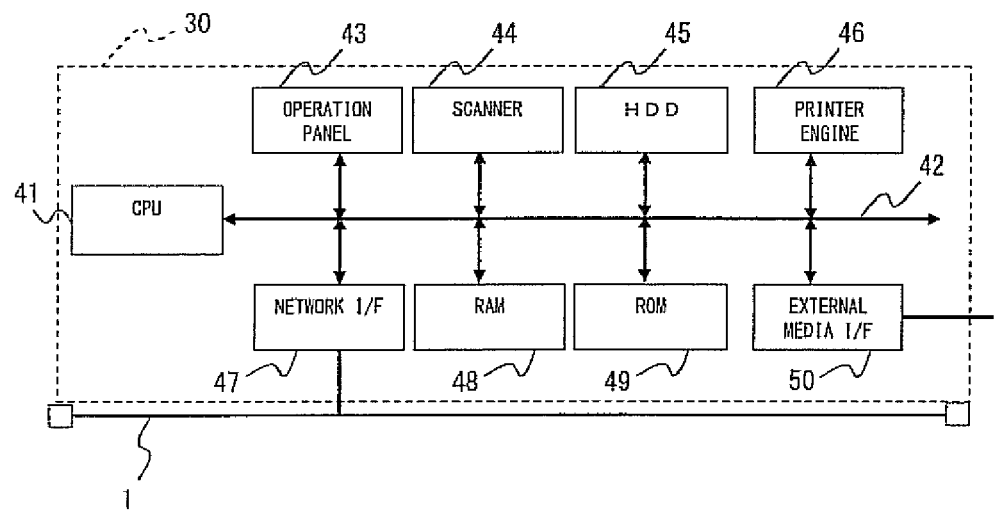
FIG. 2 shows a hardware configuration of an image forming apparatus of the embodiment.
Figures 3, 4:
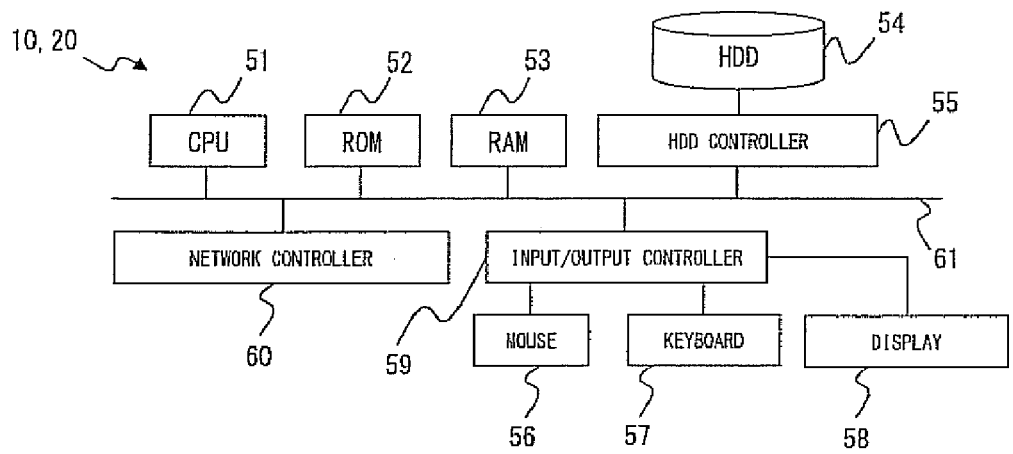
FIG. 3 shows a hardware configuration of computers making up a user terminal apparatus and a management terminal apparatus of the embodiment.
FIG. 4 shows an exemplary data configuration of image combination information stored in an image combination information storage unit of the embodiment.

FIG. 1 shows an overall configuration of a network system using one embodiment of an image formation processing system according to the present invention. In the configuration shown in FIG. 1, a user terminal apparatus 10, a management terminal apparatus 20, and an image forming apparatus 30 are connected to a LAN (local area network) 1 that is one form of network. FIG. 2 shows a hardware configuration of an image forming apparatus 30 of the embodiment and FIG. 3 shows a hardware configuration of computers making up the user terminal apparatus 10 and the management terminal apparatus 20 of the embodiment. The configuration of the embodiment will first be described with reference to FIGS. 1 to 3.

The image forming apparatus 30 is an apparatus equipped with a print function and an apparatus with a computer built-in. In FIG. 2, a CPU 41 controls operations of various mechanisms such as a scanner 44 and a printer engine 46 mounted on the apparatus in accordance with programs stored in the ROM 49. An address data bus 42 connects with various mechanisms to be controlled by the CPU 41 for data communication. An operation panel 43 accepts instructions from users and displays information. The scanner 44 reads documents set by users to accumulate the electronic data thereof in an HDD (hard disk drive) 45 and so on. The HDD 45 having stored thereon electronic document data sent through the LAN 1 or read with the use of the scanner 44. A confidential box used in the embodiment is provided on the HDD 45. The printer engine 46 prints images on output sheets in accordance with a control program executed by the CPU 41. A network interface (I/F) 47 connects with the LAN 1 and is used for reception of electronic data files to be printed, access to the apparatus through a browser and so on. A RAM 48 is used as a work memory at the time of execution of programs and a communication buffer at the time of transmission/reception of electronic data. A ROM 49 has stored thereon various programs for control of the apparatus, encryption of electronic data, and transmission/reception of electronic data. Constituent elements described later fulfill predetermined processing functions by executing the various programs. An external medium interface (I/F) 50 is an interface for external memory devices such as USB memories and flash memories.

The user terminal apparatus 10 can be implemented with a conventionally existing general-purpose hardware configuration. That is, as shown in FIG. 3, the computer is configured by connecting to an internal bus 61 a CPU 51, a ROM 52, a RAM 53, an HDD controller 55 connected to an HDD 54, an input/output controller 59 connected to a mouse 56 and a keyboard 57 provided as input units and a display 58 provided as a display device, and a network controller 60 provided as a communication unit. The user terminal apparatus 10 can be implemented by a personal computer (PC). Although performance may be different, the management terminal apparatus 20 is also a computer and, therefore, the hardware configuration thereof can be shown as in FIG. 3. The management terminal apparatus 20 can also be implemented by a PC.

In FIG. 1, the user terminal apparatus 10 is used by a user who wants to utilize the image forming apparatus 30 for printing, and includes a print requesting unit 11 that transmits an electronic data file to be printed and a print request including a print instruction. The management terminal apparatus 20 is used by an administrator who performs various settings for the image forming apparatus 30 as described later, and includes a form setup processing unit 21 that generates form image data corresponding to a combination image and a combination definition information setup processing unit 22 that sets the combination definition information.

The image forming apparatus 30 drives the printer engine 46 to operate to print a print target image in accordance with a print instruction from the user terminal apparatus 10 or an operation instruction of the operation panel 43. The image forming apparatus 30 includes a print target image acquiring unit 31, an attribute value acquiring unit 32, a rule judging unit 33, an image forming processing unit 34, a print executing unit 35, an image combination information managing unit 36, and image combination information storage unit 37. Constitutional elements unnecessary for description of the embodiment are not shown in FIG. 1.

The print target image acquiring unit 31 acquires image data sent from the user terminal apparatus 10 through the LAN 1 or preliminarily stored in the HDD 54 as image data to be printed (hereinafter, "print target image"). The attribute value acquiring unit 32 acquires attribute values related to a print target image or a print environment of a print instruction when starting execution of a print job. The image combination information storage unit 37 accumulates combination definition information described in detail later, and the rule judging unit 33 makes a judgment based on the attribute values acquired by the attribute value acquiring unit 32 and the judgment condition stored in the image combination information storage unit 37 about whether the attribute values satisfy the judgment condition. The image forming processing unit 34 actually forms an image to be printed. A combination controller 38 included in the image forming processing unit 34 performs the image combination control for the print target image in accordance with the setting contents for the rule identified by the rule judging unit 33. The print executing unit 35 executes printing of an image formed by the image forming processing unit 34. The image combination information managing unit 36 operates in cooperation with the form setup processing unit 21 and the combination definition information setup processing unit 22 of the management terminal apparatus 20 to perform information management such as registration, update, and deletion of the image combination information stored in the image combination information storage unit 37.

The constituent elements 31 to 37 in the image forming apparatus 30 are implemented through collaborative operation of the computer mounted on the image forming apparatus 30 and the program running on the CPU 41 mounted on the computer. The image combination information storage unit 37 is implemented by the HDD 54. The print requesting unit 11 of the user terminal apparatus 10 and the form setup processing unit 21 and the combination definition information setup processing unit 22 of the management terminal apparatus 20 are implemented through collaborative operation of the PCs making up the apparatuses 10 and 20 and the CPU 51 mounted on the PCs.

The programs used in the embodiment can of course be provided through a communication unit and can also be stored into and provided through a computer-readable recording medium such as CD-ROMs and DVD-ROMs. The programs provided from the communication unit or recording medium are installed in the computers and various processes are implemented by sequentially executing the installed program with the CPUs 41 and 51 of the computers.

FIG. 4 shows an exemplary data configuration of the image combination information stored in the image combination information storage unit 37 of the embodiment. In this embodiment, this image combination information must preliminarily be set before executing a print process, and description will be made of generation of a form image that may be specified as a combination image in this image combination information with reference to FIGS. 5 and 6.

Figures 5, 6A, 6B:
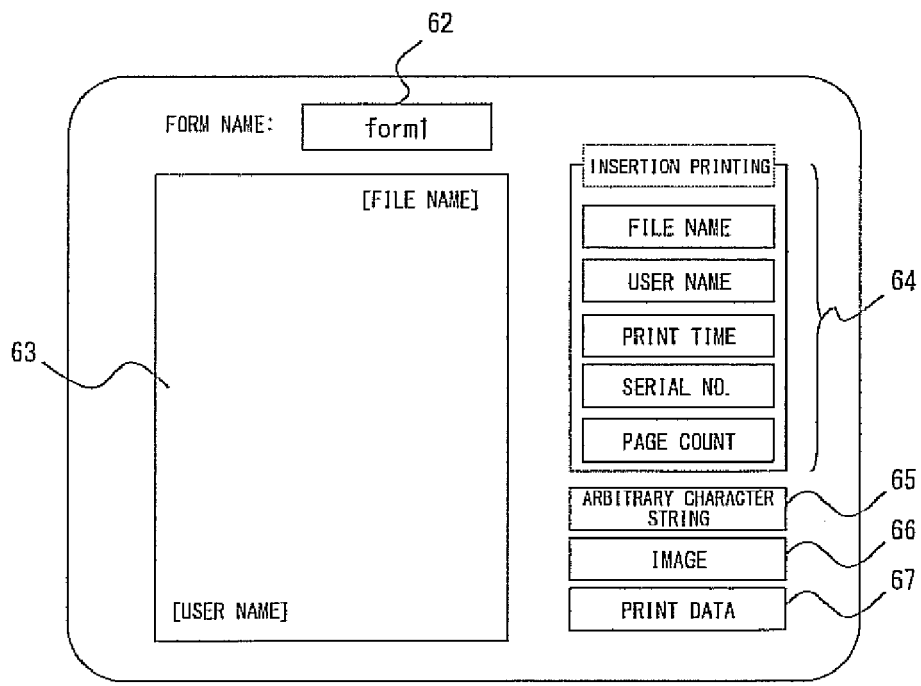
FIG. 5 shows an example of a form setup screen used in the embodiment.
FIGS. 6A and 6B show output examples of a form image generated from the setup screen of FIG. 5.

FIG. 5 shows an example of a form setup screen used in the embodiment. This setup screen is displayed on the display 58 of the management terminal apparatus 20. FIG. 5 shows a form name area 62 for entering and specifying a name of a newly generated form and a layout display area 63 displaying a layout of a form to be generated. Item buttons 64 corresponding to various attribute items allocated to a form are disposed on the right side of the setup screen. For insertion printing, the attribute buttons are provided correspondingly to the attribute items of a file name, a user name, a print time, a serial number, and a page count. Under the buttons, allocation buttons 65 to 67 are provided for allocating an arbitrary character string, an image, and print data on a form. In this embodiment, a form can be generated with the use of these buttons 64 to 67 as follows.

First, when one wants to print a file name, which is one of the attribute values, on the upper right of a print sheet, the attribute button of the file name is dragged and dropped on the upper right of the layout display area 63. When one wants to print the user name attribute on the lower left of the print sheet, the attribute button of the file name is dragged and dropped on the lower left of the layout display area 63. FIG. 5 exemplarily illustrates a form layout in this situation. Therefore, when this form 1 is combined and printed with the print target image, a file name of the print target image is printed on the upper right of a print sheet, and a name of a user instructing the print of the print target image is printed on the lower left of the print sheet. Other attribute items included in the insertion printing can also be allocated to the form 1 with similar operations.

When the arbitrary character string allocation button 65 is dragged and dropped at a desired position of the layout display area 63, an area is disposed for printing a character string input by a user at a position of the drop. When the image allocation button 66 is dragged and dropped at a desired position of the layout display area 63, a print area is disposed for an image file specified by a user at a position of the drop. When the print data allocation button 67 is dragged and dropped at a desired position of the layout display area 63, a print area is disposed for a text data file specified by a user at a position of the drop. Print areas of character strings and images can appropriately be adjusted by mouse operation and so on. This also applies to the attribute items of the insertion printing.

The image data of the form generated as above are registered into the image combination information storage unit 37 by the image combination information managing unit 36 in accordance with a selecting operation through a save button not shown and so on. Examples of output images of registered forms are shown in FIGS. 6A and 6B. FIG. 6A shows an example of an image of a form name "form 1" corresponding to the example of the setup screen of FIG. 5, and FIG. 6B shows an example of an image of a form name "form 2" with only the file name attribute allocated on the upper right of the print sheet.

Figure 7:
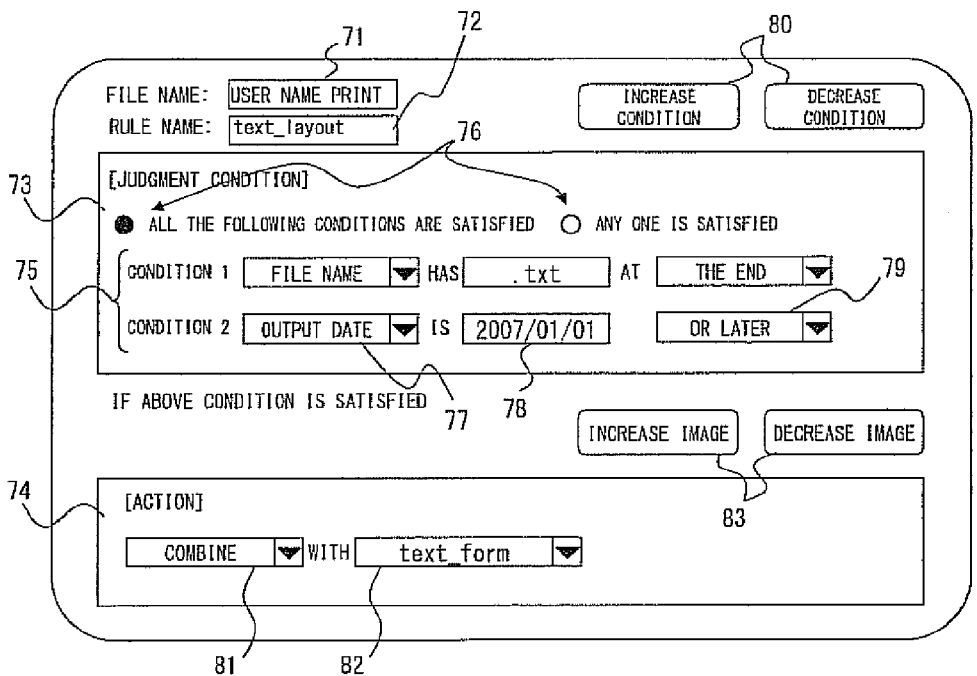
FIG. 7 shows an example of a setup screen for combination definition information used in the embodiment.

FIG. 7 shows an example of a setup screen for the combination definition information (hereinafter, "combination definition information setup screen") used in the embodiment. This setup screen is displayed on the display 58 of the management terminal apparatus 20. In FIG. 7, setting areas 71 and 72 for specifying a process name and a rule name, a judgment area, and setting areas 73 and 74 for action are disposed, and an administrator sets necessary matters from the areas. In the setting area 71, a name of a process for classifying and managing rules described later is specified. Since a "user name print" is set in the example shown in FIG. 7, it can be comprehended that a rule for printing a user name is defined. A name allocated to a rule set in this setting screen is specified in the setting area 72.

In the judgment condition setting area 73, a judgment condition is specified about whether the action of the subsequent part is executed. FIG. 7 shows an example of setting two conditions 75. Among areas 77 to 79 of setting condition elements provided for setting the condition 75, an attribute item is specified in the area 77; an attribute value of the attribute item is specified in the area 78; and a status of the attribute value is specified in the area 79. Among these areas, the areas 77 and 79 are allocated with pull-down menus and a setter can make a selection from displayed menu items. The areas 78 and 79 become different in accordance with a type of an attribute item to be set as a condition and, therefore, may not be displayed due to contents of the setting in the area 77 as exemplarily illustrated in FIG. 8. This also applies to characters displayed among the areas 77 to 79. A radio button 76 for specifying a true/false determination condition of the judgment condition is disposed to determine whether the judgment condition is satisfied when all the set conditions are satisfied or when any one condition is satisfied. Condition increasing/decreasing buttons 80 are operation buttons for increasing and decreasing the number of conditions set as the conditions 75. For example, in the setting state of FIG. 7 having two set conditions, when the "increase condition" button is selected, a setting area for a condition 3 is disposed in the judgment condition setting area 73 and, on the other hand, when the "decrease condition" button is selected, only the setting area for the condition 1 is disposed in the judgment condition setting area 73. As above, a setter operates the condition increasing/decreasing buttons 80 to adjust the number of conditions included in the judgment condition.

In the action setting area 74, details are specified for a process to be executed when the condition set in the judgment condition setting area 73 is satisfied. With regard to areas 81 and 82 for setting elements of the action, the area 81 is specified by selecting "combine" or "not combine" from a pull-down menu. The area 82 is specified by a form image name of a combination image to be combined in the case of combining images. The pull-down menu of the area 82 displays a list of names of forms generated with the use of the form setup screen of FIG. 5, and a setter makes a selection from the list. The form names displayed on the list are acquired by making a request to the image combination information managing unit 36. When "not combine" is selected in the area 81, the area 82 is not displayed.

Image increasing/decreasing buttons 83 are operation buttons for increasing and decreasing the number of form images combined with a print target image. For example, in the setting state of FIG. 7 having one set form image, when the "increase image" button is selected, one area 82 is added and displayed in the action setting area 74 for separately specifying a form image in addition to "text_form". On the other hand, when the "decrease image" button is selected, one area 82 is erased in the action setting area 74. As above, a setter operates the image increasing/decreasing buttons 83 to select the image to be combined.

Figure 8:
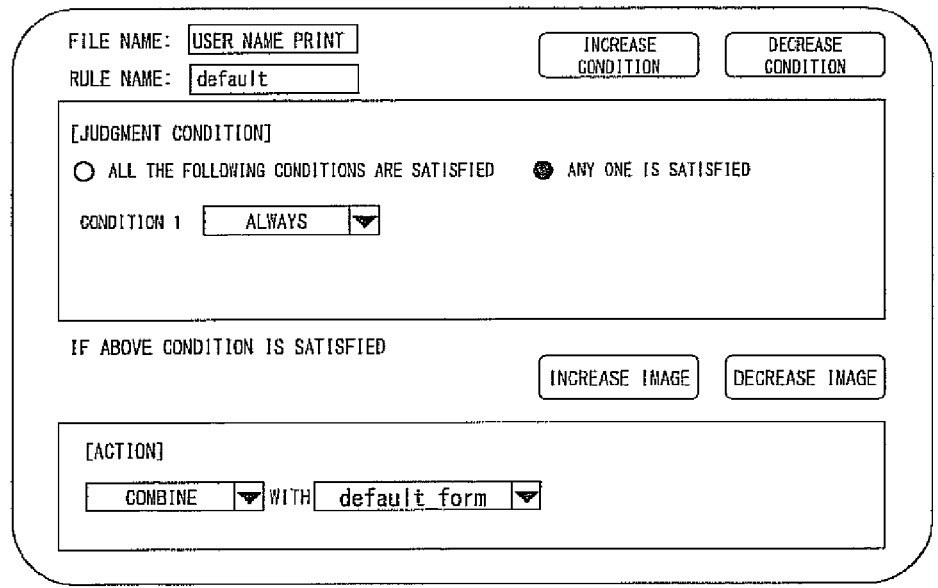
FIG. 8 shows a display example of a combination definition information setup screen when a different rule is set in the process same as FIG. 7.

FIG. 8 shows a screen display example when a different rule (rule name "default") is set in the same process (process name "user name print") as FIG. 7. The combination definition information generated as above is registered into the image combination information storage unit 37 by the image combination information managing unit 36 in accordance with a selecting operation through a save button not shown and so on.

FIG. 9 shows an example of image combination information generated when the above setup is performed for the process (process name "user name print"), and the image combination information of FIG. 4 will be described with reference to FIG. 9.

The image combination information is made up of combination definition information generated with the use of the combination definition information setup screen and a form image generated with the use of the form setup screen described above. The image combination information is generated for each process of combining images, such as an image combination process related to printing of a user name described above.

For the combination definition information included in each process, one or plural rules can be set, and one or plural conditions can be set as judgment conditions for each rule identified by a rule name. An action is also set that is executed when a true/false determination condition is satisfied, i.e., when all the conditions are satisfied or when any one condition is satisfied. Although not shown, the image combination information includes the true/false determination condition. As can be seen from the combination definition information setup screen, the action is specified by necessity of combination and by a form image name if combination is necessary.

The form image included in each process includes form image data specified by the action. However, since the inclusion of the form image data in the image combination information is not efficient for storage capacity when consideration is given to sharing a form with other processes, the form image data itself may not be included in the image combination information. In such a case, a form image to be combined is identified from a form image name set in the action.

By setting information necessary for implementing the embodiment as above, a print process can be executed to perform the image combination characteristic of the embodiment. The operation of the embodiment will hereinafter be described.

Figure 10:
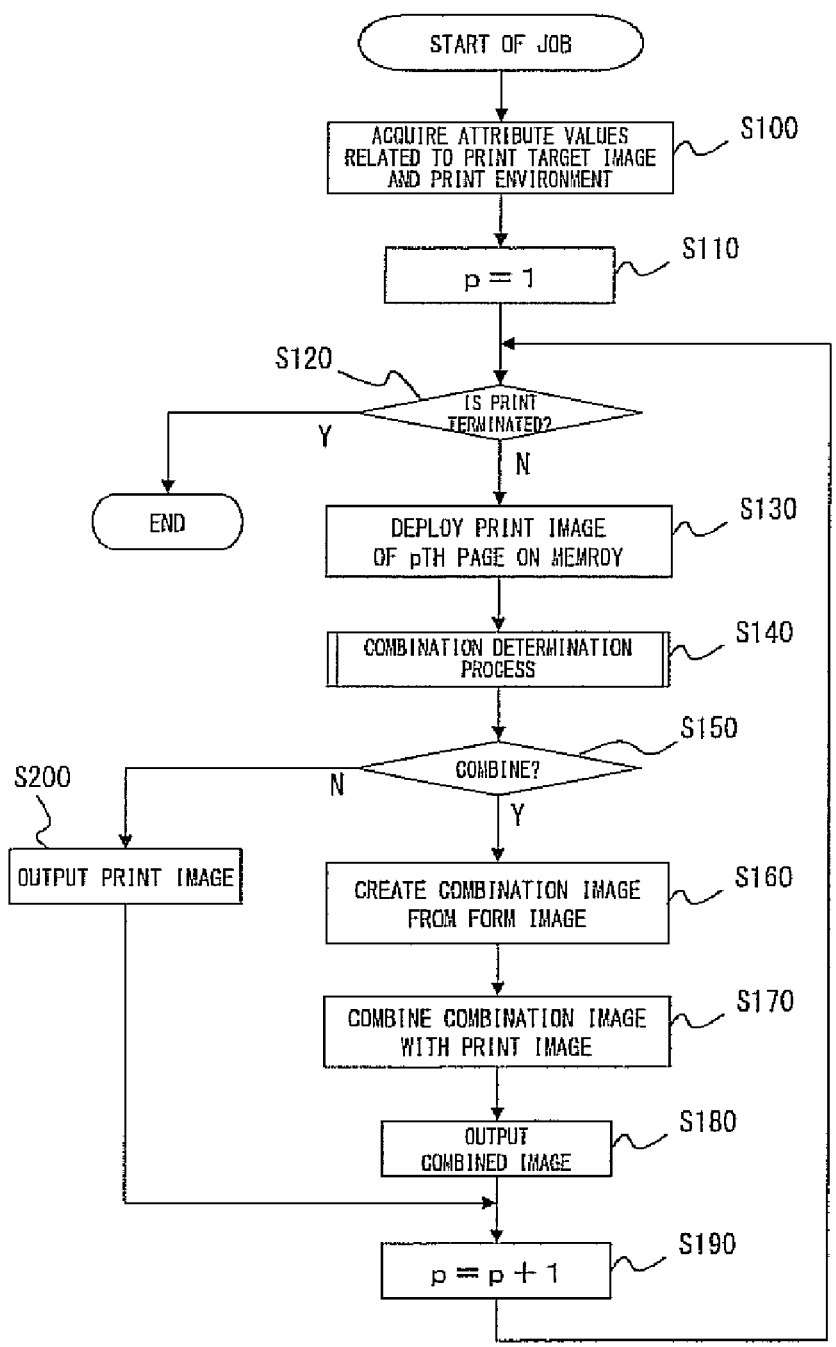
FIG. 10 is a flowchart of a process from the start of execution of a print job in the embodiment.

When the print requesting unit 11 of the user terminal apparatus 10 transmits to the image forming apparatus 30 a print request including a print target image and print instruction details in accordance with a print instruction from a user, the image forming apparatus 30 accepts this request. When the execution time of the print instruction has come, execution of a print job generated in accordance with the print instruction is started. A process after starting execution of a print job will hereinafter be describe with reference to a flowchart shown in FIG. 10.

When the job is started, the attribute value acquiring unit 32 acquires attribute values related to a print target image or a print environment acquired by the print target image acquiring unit 31 (step 100). The attribute values related to a print target image are attribute values of the print target image file, instruction details included in the print instruction and so on. The attribute values related to a print environment are specification information, function information, connected network information and so on, of the image forming apparatus 30 executing the printing. In this embodiment, various attribute values are acquired when a print job is started. For example, although a size of paper sheets loaded in the image forming apparatus 30 may be different between times of requesting printing and of executing printing, such a case can be supported in this embodiment since various attribute values are collected at the start of execution of printing.

In this embodiment, each page of the print target image is judged by a rule to make a determination about the action, i.e., whether images are combined. Therefore, although the process is sequentially executed from a first page (step 110), the following process is repeatedly executed until the process for the last page is completed (Y at step 120).

Figure 11:
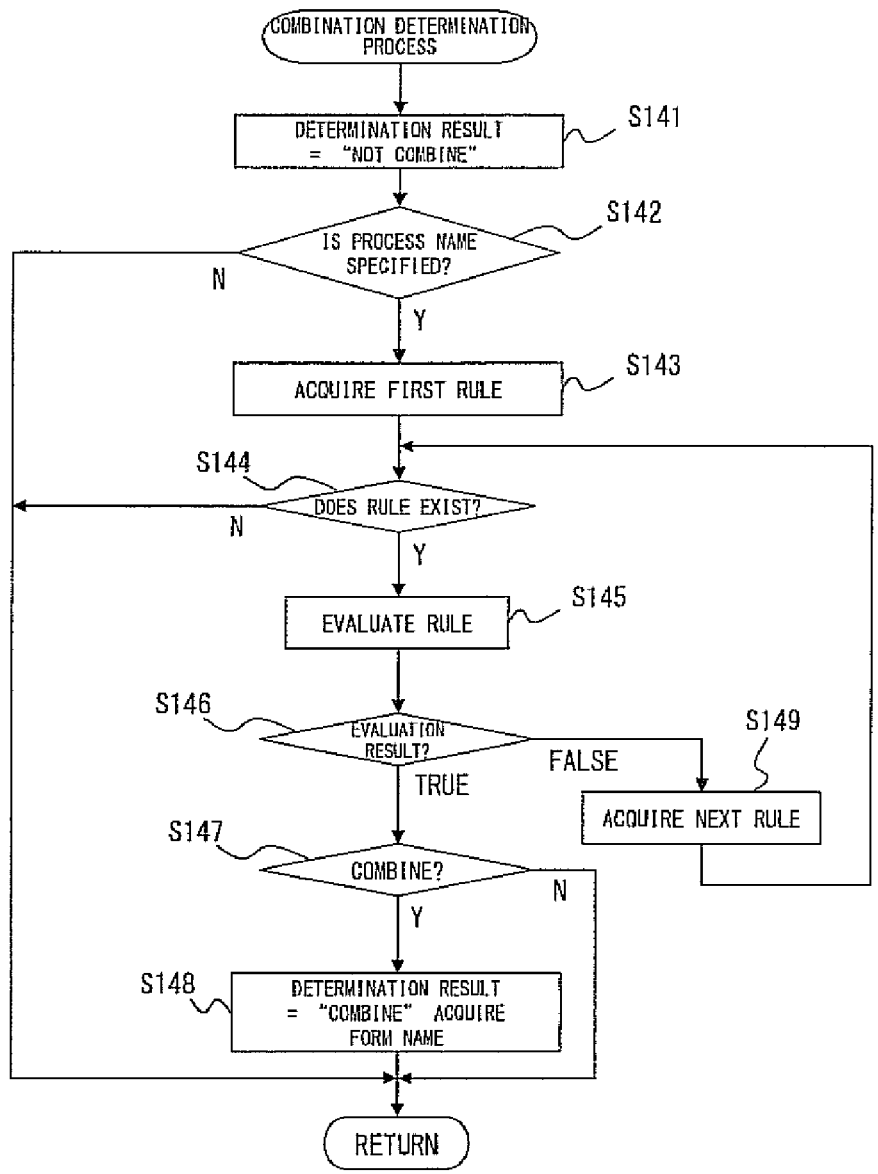
FIG. 11 is a flowchart of a combination determination process of FIG. 10.

First, when a process target page of the print target image is deployed on the memory (RAM 48) (step 130), the rule judging unit 33 identifies a rule used for judging necessity of combination with the page and so on. A combination determination process executed for identifying the rule will hereinafter be described with reference to a flowchart shown in FIG. 11.

When executing the combination determination process, the rule judging unit 33 sets "not combine" as an initial value of a determination result (step 141). The print instruction from the user requesting the image combination specifies which process name corresponds to a piece of information to be used among pieces of the image combination information registered in the image combination information storage unit 37. When a process name is not specified (N at step 142), it is determined that no request is made by a user for the image combination and "not combine" is returned as a determination result. When a process name is specified (Y at step 142), a first rule is picked up from rules included in the combination definition information of the relevant image combination information (step 143), and evaluation is performed in accordance with the rule (step 145). The evaluation in this case is to check the attribute values acquired by the print target image acquiring unit 31 against a judgment condition set for the rule to determine whether the attribute values satisfy the judgment condition. Although the judgment condition may include plural conditions as above, a determination is made from a condition located on the upper part in this case, and the determination of whether the judgment condition is satisfied is determined in accordance not only with determination of whether each condition is satisfied but also with the true/false determination condition of the judgment condition, which is whether all the set conditions are satisfied or any one condition is satisfied. The determination is performed for the conditions included in the judgment condition in the order of registration as the judgment condition.

When it is determined as a result of this rule evaluation that the judgment condition is not satisfied (FALSE at step 146), the next rule included in the combination definition information is acquired (step 149). The above rule evaluation is then performed (step 145). When the next rule does not exist (N at step 144), "not combine" is returned as a determination result. Because of this process, when it is determined that the judgment condition is satisfied at the rule located in the upper part of the combination definition information, the evaluation is not performed for rules located in the lower part and, therefore, the combination definition information must be generated with consideration given to the order of setting rules.

Although the attribute values are acquired when starting the execution of printing in this embodiment, it is desirable to acquire the attribute values when the evaluation is performed for a page to be exact since the rule is evaluated for each page. This is because some attribute values are changed in the course of execution of printing. For example, this corresponds to availability of a staple when the number of paper sheets to be stapled exceeds the specification of the image forming apparatus 30, impossibility of printing due to overflow of a discharge tray and so on.

When it is determined in evaluation of any one rule that the rule satisfies the judgment condition (TRUE at step 146), this causes the rule judging unit 33 to identify a rule of image combination for the print target image.

The rule judging unit 33 then refers to the action included in the rule and determines whether the combination is performed from details of the action. When the setting of the rule indicates that the combination is not performed (N at step 147), "not combine" is returned as a determination result. On the other hand, when the setting of the rule indicates that the combination is performed (Y at step 147), "combine" is set as a determination result, and a name of a form image to be combined is acquired from the details of the setting for the action (step 148).

Referring to FIG. 10 again, when it is determined that the combination is performed in the combination determination process (Y at step 150), the image forming processing unit 34 takes out a form image identified by the form name from the image combination information storage unit 37. When the taken-out form image is allocated with an attribute item on the form for the insertion printing at the time of setting the form, a combination image is completed by allocating an attribute value of the preliminarily allocated attribute item at a preliminarily specified position on the form (step 160). That is, as described with reference to FIGS. 5 and 6, for example, the combination image is formed such that an actual file name of the print target image acquired from the attribute value acquiring unit 32 is allocated at the allocation position of the file name. If no attribute item included in the insertion printing is allocated on the form, the form image is directly employed as the combination image.

After completing the combination image as above, the image forming processing unit 34 combines the combination image with the print target image to generate an actually printed print image (step 170). The print executing unit 35 prints the generated combined image (step 180). On the other hand, when it is determined that the combination is not performed in the combination determination process (N at step 150), the image forming processing unit 34 generates a print image from the print target image in accordance with a print instruction other than the image combination, and print executing unit 35 prints the generated combined image (step 200). The next page is then processed (step 190), and the above process is repeatedly executed until the printing is completed.

Figure 12A:
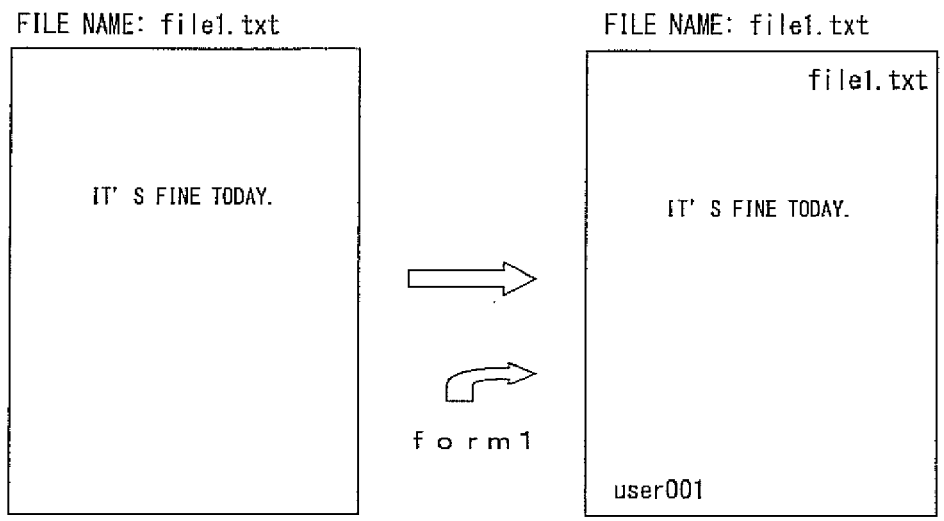
FIGS. 12A and 12B show conceptual views of image combination performed in the embodiment.
Figure 12B:
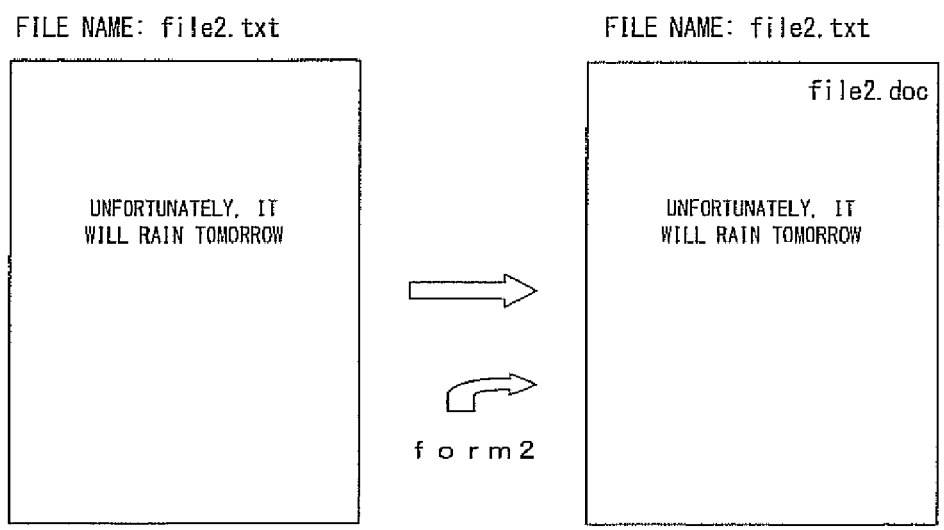

FIGS. 12A and 12B are conceptual views of image combination performed in the embodiment. In an example shown in FIG. 12A, it is determined that combination with "form1" is performed as a result of the evaluation by the rule judging unit 33 and, therefore, a file name "file1.txt" of the print target image and a user name "user001" requesting the printing are combined and printed at the upper right and the lower left, respectively, of a print sheet. In an example shown in FIG. 12B, it is determined that combination with "form2" is performed and, therefore, only a file name "file2.doc" of the print target image is combined and printed at the upper right of a print sheet.

In the description of the setting of the combination definition information using FIGS. 7 and 8, it has been described that plural form images can be set as images to be combined. When plural images to be combined exists, if the combined images are simply combined, colors of overlapping portions may be mixed and changed. Therefore, in this embodiment, the order of combination is determined, and the combination with the print target image is one-by-one performed in this order. The order is assumed to be the order of description on the setup screen of the combination definition information, for example.

In the embodiment, as described above, the attribute values acquired at the start of execution of printing are checked against the judgment condition to determine the necessity of image combination and an image to be combined when the image combination is performed. The attribute values identified at the start of execution of printing include a clock time when the execution of printing is started, for example. This embodiment also corresponds to an example of changing the attribute values from those at the time of print instruction when the number of printed sheets to be stapled exceeds the specification of the image forming apparatus during the execution of the printing.

Although the setting of the image combination information is executed in the management terminal apparatus in this embodiment, the above setup screen may be displayed on the operation panel 43 of the image forming apparatus 30 such that the setting can be executed in the image forming apparatus 30.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   a first acquiring unit that acquires a print target image;
   a memory that has stored thereon a combination image to be combined with the print target image in association with a judgment condition for determining whether the combination image is combined with the print target image;
   a second acquiring unit that acquires attribute values related to the print target image or a print environment when starting execution of printing of the print target image;
   a judging unit that makes a judgment based on the attribute values acquired by the second acquiring unit and the judgment condition stored in the memory about whether the attribute values satisfy the judgment condition; and
   a combination controller that performs control to combine the combination image with the print target image when the judging unit judges that the attribute values satisfy the judgment condition.

2. The image forming system of claim 1, wherein the combination image is completed by incorporating a predetermined attribute value among the attribute values acquired by the second acquiring unit into a combination image to be combined, and wherein the completed combination image is combined with the print target image.

3. The image forming system of claim 1, wherein when the print target image is made up of a plurality of pages, the judging unit judges whether the attribute values satisfy the judgment condition for each page.

4. The image forming system of claim 1, wherein when a plurality of the combination images are correlated with the judgment condition in the memory, the combination controller sequentially combines the combination images with the print target image one-by-one.

5. The image forming system of claim 1, wherein the judgment condition stored in the memory is made up of a plurality of conditions.

6. A non-transitory computer readable medium storing a program causing a computer to execute a process, the process comprising:
   acquiring a print target image; storing a combination image to be combined with the print target image in association with a judgment condition for determining whether the combination image is combined with the print target image;
   acquiring attribute values related to the print target image or a print environment when starting execution of printing of the print target image;
   making a judgment based on the acquired attribute values and the judgment condition about whether the attribute values satisfy the judgment condition; and
   performing control to combine the combination image with the print target image when it is judged that the attribute values satisfy the judgment condition.

7. An image forming system according to claim 1 wherein the image forming system is configured as a single apparatus.

8. An image forming method comprising:
   acquiring a print target image; storing a combination image to be combined with the print target image in association with a judgment condition for determining whether the combination image is combined with the print target image;
   acquiring attribute values related to the print target image or a print environment when starting execution of printing of the print target image;
   making a judgment based on the acquired attribute values and the judgment condition about whether the attribute values satisfy the judgment condition; and
   performing control to combine the combination image with the print target image when it is judged that the attribute values satisfy the judgment condition.

\* \* \* \* \*